(12) United States Patent
Plenderleith et al.

(10) Patent No.: US 11,630,813 B1
(45) Date of Patent: Apr. 18, 2023

(54) TRANSPARENT DATABASE NORMALIZATION IN PROVIDER NETWORKS

(71) Applicant: Amazon Technologies, Inc., Seattle, WA (US)

(72) Inventors: Jamie Plenderleith, Dublin (IE); James McCann, Belfast (GB)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 16/367,713

(22) Filed: Mar. 28, 2019

(51) Int. Cl.
*G06F 16/21* (2019.01)
*G06F 16/22* (2019.01)
*G06F 17/18* (2006.01)
*G06F 16/903* (2019.01)

(52) U.S. Cl.
CPC .......... *G06F 16/214* (2019.01); *G06F 16/211* (2019.01); *G06F 16/2282* (2019.01); *G06F 16/903* (2019.01); *G06F 17/18* (2013.01)

(58) Field of Classification Search
CPC ................ G06F 16/214; G06F 16/903; G06F 16/2282; G06F 16/211; G06F 17/18
See application file for complete search history.

(56) References Cited

U.S. PATENT DOCUMENTS

| 2005/0160102 | A1* | 7/2005 | Abdo | G06F 16/2456 |
| 2008/0120321 | A1* | 5/2008 | Liu | G06F 16/24542 |
| 2017/0123889 | A1* | 5/2017 | Haridas | G06F 11/0751 |
| 2018/0115625 | A1* | 4/2018 | Livneh | H04W 12/02 |
| 2018/0314737 | A1* | 11/2018 | Chong | G06F 16/2282 |
| 2019/0207962 | A1* | 7/2019 | Wang | G06F 11/0754 |

* cited by examiner

*Primary Examiner* — Ashish Thomas
*Assistant Examiner* — Dustin D Eyers
(74) *Attorney, Agent, or Firm* — Nicholson De Vos Webster & Elliott LLP

(57) ABSTRACT

Techniques for database normalization recommendation and transparent database normalization are described. A normalization engine can analyze the data stored by database tables to determine scenarios in which normalization of the tables may be beneficial. The normalization engine can recommend normalization to an end user, such as during a database migration process. The normalization engine can alternatively perform row-by-row or complete columnar normalization and cause queries issued against normalized tables based on the previous table schema to be automatically rewritten to adhere to the updated data layout.

20 Claims, 10 Drawing Sheets

"AUDIT_RECORDS" TABLE 502

| ID | DESCRIPTION |
|---|---|
| 1 | USER MADE A LOGON ATTEMPT |
| 2 | USER LOGGED OUT |
| 3 | USER MADE A LOGON ATTEMPT |
| ... | |
| 18,001 | USER MADE A LOGON ATTEMPT |

QUERY 504

```
SELECT    DESCRIPTION, COUNT()
FROM      AUDIT_RECORDS
GROUP BY  DESCRIPTION
ORDER BY  COUNT() DESC
```

QUERY RESULT 506

"USER MADE A LOGON ATTEMPT",    10,000
"USER LOGGED OUT",               8,000
"USER WAS SHOWN AD=1XVZ",            1

MODIFIED "AUDIT_RECORDS" TABLE 510

| ID | DESCRIPTION | DESCRIPTION_ID |
|---|---|---|
| 1 | NULL | 1 |
| 2 | NULL | 2 |
| 3 | NULL | 1 |
| ... | | ... |
| 18,001 | NULL | 1 |

FIELD MAY BE DROPPED

"AUDIT_RECORDS_DESCRIPTION" TABLE 512

| ID | DESCRIPTION |
|---|---|
| 1 | USER MADE A LOGON ATTEMPT |
| 2 | USER LOGGED OUT |
| 3 | USER WAS SHOWN AD=1XVZ |

*FIG. 5*

TRANSPARENT DATABASE NORMALIZATION IN PROVIDER NETWORKS

BACKGROUND

Many companies and other organizations operate computer networks that interconnect numerous computing systems to support their operations, such as where computing systems are co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Many public data center operators, such as service providers who operate service provider networks, offer their customers a variety of resources as services. For example, one popular set of services involve databases, where customers may utilize various types of databases such as relational databases often used for transactional applications, non-relational databases for internet-scale applications, data warehouses for analytics applications, in-memory data stores for caching and/or real-time workloads, graph databases for building applications with highly-connected data, time-series databases for measuring changes over time or predicting future time-series values, ledger databases to maintain verifiable records of transactions, etc. Accordingly, many types of applications fundamentally rely on databases to provide many different services and functionalities. Thus, the performance of database systems, therefore, directly affects the performance of these different applications.

BRIEF DESCRIPTION OF DRAWINGS

Various embodiments in accordance with the present disclosure will be described with reference to the drawings, in which:

FIG. 5 is a diagram illustrating exemplary database normalization according to some embodiments.

DETAILED DESCRIPTION

Various embodiments of methods, apparatus, systems, and non-transitory computer-readable storage media for transparent database normalization in provider networks are described. According to some embodiments, a normalization engine analyzes the data present in one or more tables of one or more databases to detect scenarios—based on the characteristics of the stored data—where normalization may be beneficial. The normalization engine may detect these scenarios, for example, during a database migration where one or more databases are migrated from one location to another (e.g., from an on-premises network into a provider network) and/or from one type of database engine to another. A normalization engine may also detect tables that would benefit from normalization as these databases are used, e.g., the normalization engine may periodically search for and detect database tables as they become candidates for normalization, which may change over time due to changes in data stored by the tables, changes in the application's structure over time, etc.

In some embodiments, the normalization engine can normalize a database table without requiring database clients to be aware of the normalization or modify their queries involving these tables. For example, the normalization engine can be implemented between database clients and database engines to detect queries that involve a table that has been normalized and rewrite these queries to instead access the normalized tables. Accordingly, the normalization engine can automatically provide the benefits of normalization in scenarios when normalization would be beneficial, potentially without even needing to update the database clients to instead access the different, post-normalization database tables.

As a result, embodiments disclosed herein can significantly reduce the storage space requirements for databases and thus effectively "compress" the underlying storage by removing duplicated data. Beneficially, this may also potentially allow for large databases tables to instead fit within memory, speeding up the performance of the database and thus the calling client applications. Moreover, embodiments disclosed herein prevent the need for application developers to perfectly architect their underlying database schemas during the initial development of an application. Instead, as applications are developed and used, the normalization engine can identify tables that would benefit from normalization for these developers and/or perform normalization on behalf of the developers. Similarly, embodiments disclosed herein can identify scenarios in which normalization could be "undone" using similar techniques to eliminate potentially costly overheads involved with multiple tables (e.g., the need for table joins in queries, overhead required for having multiple tables).

Figure 1:
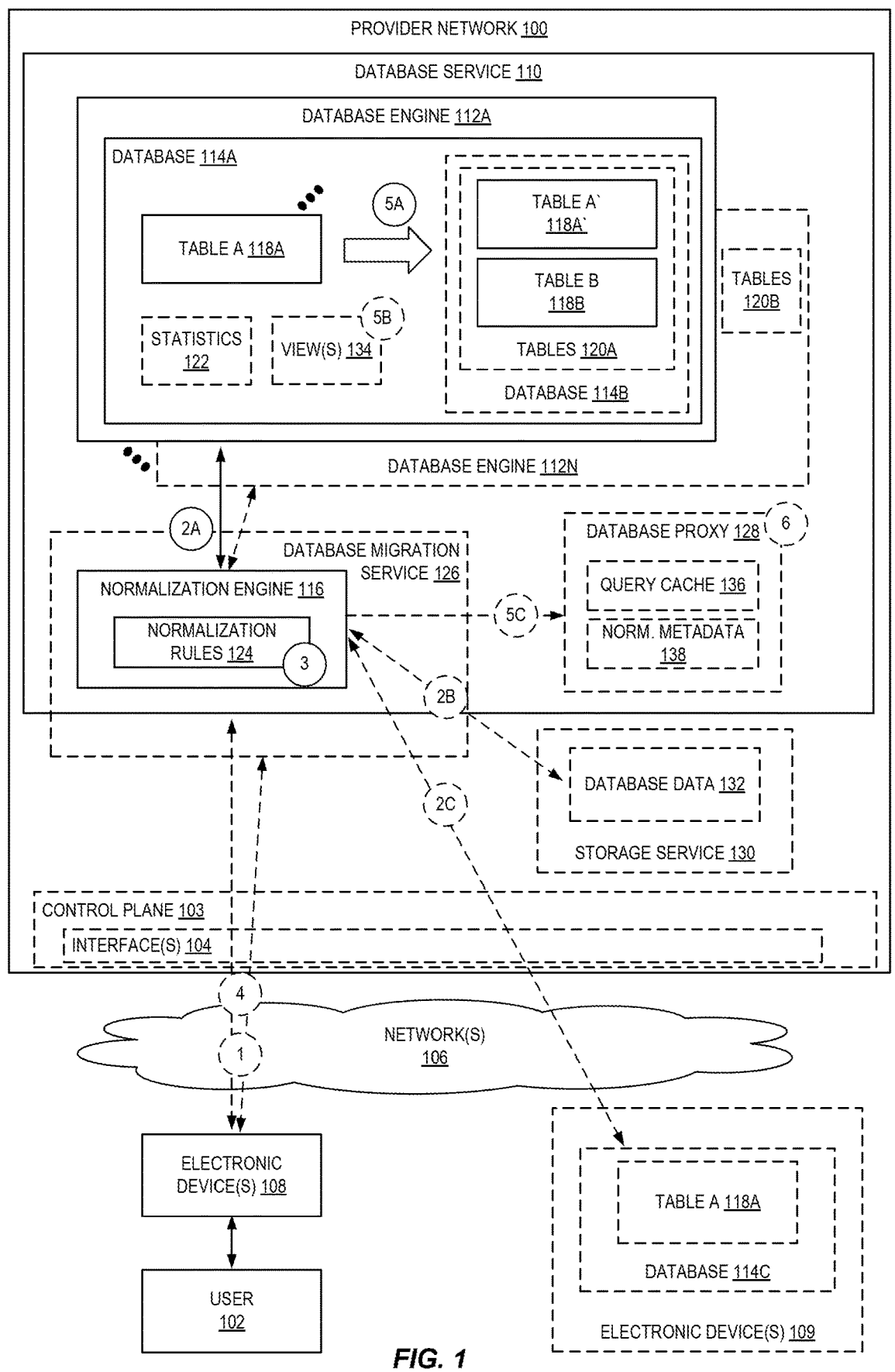
FIG. 1 is a diagram illustrating an environment for database normalization recommendation and transparent database normalization according to some embodiments.

FIG. 1 is a diagram illustrating an environment for database normalization recommendation and transparent database normalization according to some embodiments. In FIG. 1, one or more databases 114 are shown as being implemented by one or more database engines 112A-112N. In some embodiments, the database(s) 114 are part of one or more database services 110 provided by a provider network 100, which may offer users access to a variety of computing-related services.

One such service is a database service 110. The database service 110 may be implemented as one or more software modules executed by one or more computing devices of a provider network 100. The database service 110 may be a managed service that makes it easy for users to set up, operate, and scale databases 114 in the provider network 100 in the form of database instances (not illustrated). The database service 110 may rely on the virtualization techniques described above to allocate the compute and storage resources to provide a database instance. For example, the database service 110 may provision resources of one or more host devices to host a database instance. The database service 110 may provide resizable capacity while managing time-consuming database administration tasks. The database service 110 may provide one or more of a variety of database engines 112A-112N (e.g., relational database engines such as MySQL, MariaDB, Oracle™, SQL Server, PostgreSQL, etc., and/or non-relational database engines) allowing existing code, applications, and/or tools to work seamlessly with databases provided by the database service 110. In some embodiments, the database service 110 may perform administrative tasks such as automatically backing up databases, upgrading and/or patching database software, scaling the compute resources or storage capacity associated with its database instances, etc.

Users 102 of the provider network 100 may interact with the database service 110 to implement one or more databases 114, which may include the user 102 utilizing a console of a web-based application to issue one or more requests to an endpoint associated with the database service 110 indicating the user's 102 desire to launch/configure one or more databases 114. A management engine or controller (not illustrated) of the database service 110 may then, in response, perform operations to obtain compute resources (e.g., virtual machines (VMs) executed by host device(s)) for the database 114 instance(s) within the provider network 100, launch VM images (optionally having code for the database pre-installed), optionally launch or install databases on the host device(s), configure the database instances, configure security rules and/or permissions used by the databases 114 or used for accessing the databases, etc.

Thereafter, database client applications may issue queries to a database 114 instance to read/write data from/to the database. Such database client applications may be executed by electronic devices inside of the provider network 100 (e.g., hosted on a VM) or outside of the provider network 100 and interact with the database instances via network(s) 106 and interface(s) 104.

In some embodiments, database client applications may interact with databases via a database proxy 128, which may be implemented using software that is communicatively coupled between the client applications and the databases 114. A database proxy 128 may be deployed in a transparent manner and thus provide interactions between database clients and databases according to a same database interface so that the database clients and databases behave as if communications were directly passed between the database clients and databases. For example, the database proxy 128 may receive access requests (e.g., database queries) from database clients formatted according to a database interface, may optionally process these requests, and pass on the requests to the databases. Similarly, the database proxy 128 may receive responses from the databases, optionally process these responses and modify them, and pass on the original responses or modified responses back to the clients.

These interactions between database clients, database proxies, and databases as described herein may be implemented according to different technologies, including, but not limited to, utilizing vendor-specific native application programming interfaces (APIs) or APIs utilizing Simple Object Access Protocol (SOAP) or Representational state transfer (REST) technologies. SOAP is a protocol for exchanging information in the context of network-based services. REST is an architectural style for distributed hypermedia systems. A RESTful API (which may also be referred to as a RESTful network-based service) is a network-based service API implemented using HyperText Transport Protocol (HTTP) and REST technology. The interfaces described herein may in some embodiments be wrapped with client libraries in various languages, including, but not limited to, C, C++, Java, C # and Perl to support integration with databases, such as databases 114.

Generally speaking, a provider network 100 provides users with the ability to utilize one or more of a variety of types of computing-related resources such as compute resources (e.g., executing VM instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users 102 may interact with a provider network 100 across one or more intermediate networks 106 (e.g., the internet) via one or more interface(s) 104, such as through use of API calls, via a console implemented as a website or application, etc. The interface(s) 104 may be part of, or serve as a front-end to, a control plane 103 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

For example, in various embodiments, a "serverless" function may include code provided by a user or other entity that can be executed on demand Serverless functions may be maintained within provider network 100 and may be associated with a particular user or account or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an API call or a specially formatted HTTP request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. By way of example, various components described herein can be executed as serverless functions, e.g., a database proxy 128, a normalization engine 116, etc.

As described herein, a normalization engine 116 may identify database tables, based on characteristics of these tables such as characteristics of the data stored in those tables, that are candidates for normalization. Normalization may include, for example, moving some or all data values of a field (or column) of a first database table into a second table (that may be newly created), adding a field to the first table to store identifiers that point to values of the second table (that used to be stored by the first table) for scenarios in which entries of a first table may have zero or one values now stored in the second table, adding a third table with entries that associate an entry of the first table with an entry of the second table (where an entry of the first table may have zero, one, or multiple values that used to be stored by the first table), etc. However, these and other normalization techniques are known to those of skill in the art, and thus other normalizing techniques may be applied in a similar manner.

The normalization engine 116 may perform analysis to perform this identification of candidate tables for normalization in a variety of different scenarios in varying embodiments. As one example, in some embodiments the normalization engine 116 may be implemented as part of a database migration service 126 that migrates user data to and from widely-used commercial and/or open-source databases, where the databases may be located outside the provider network 100 (e.g., as implemented as a database 114C by one or more electronic devices 109, which may be in an on-premise network of a user) and/or within the provider network 100 (e.g., as implemented by a database engine 112 within a database service 110 of a provider network 100, as stored as database data 132 (e.g., a database backup) within a storage service 130). Such a database migration service 126 may, for example, support homogeneous migrations (e.g., such as from an Oracle™ database to another Oracle™ database) and/or heterogeneous migrations between different database platforms/engines (e.g., such as from Oracle™ to MySQL). Migrations may also move user data between SQL, NoSQL, and text-based targets.

Accordingly, at circle (1) a user 102—via use of an electronic device 108 such as a Personal Computer (PC), laptop, tablet, or other mobile device—may issue a request to migrate a database 114 (e.g., database 114C, database 114A, etc.) into another database (e.g., database 114A, database 114B), which may be of a same or different type. As part of this migration process, the normalization engine 116 may access the "source" database(s) and the data stored therein or metadata/statistics describing the data stored therein (e.g., at circle (2A) for accessing a database 114A having one or more tables 118A, at circle (2B) for accessing database data 132, or circle (2C) for accessing database 114C), and perform operations for determining whether any of the tables (e.g., table A 118A) is a candidate for normalization. The operations may include utilizing a number of normalization rules 124 (or heuristics) at circle (3) to identify an initial set of candidate tables for normalization, and then from this initial set of candidate tables, determine whether the tables are actual candidates based on an analysis of characteristics of the data stored therein. Example normalization rules 124 may include one or more logical tests, e.g., based on threshold as described herein, to identify tables and/or fields that could or should be normalized.

Figure 2:
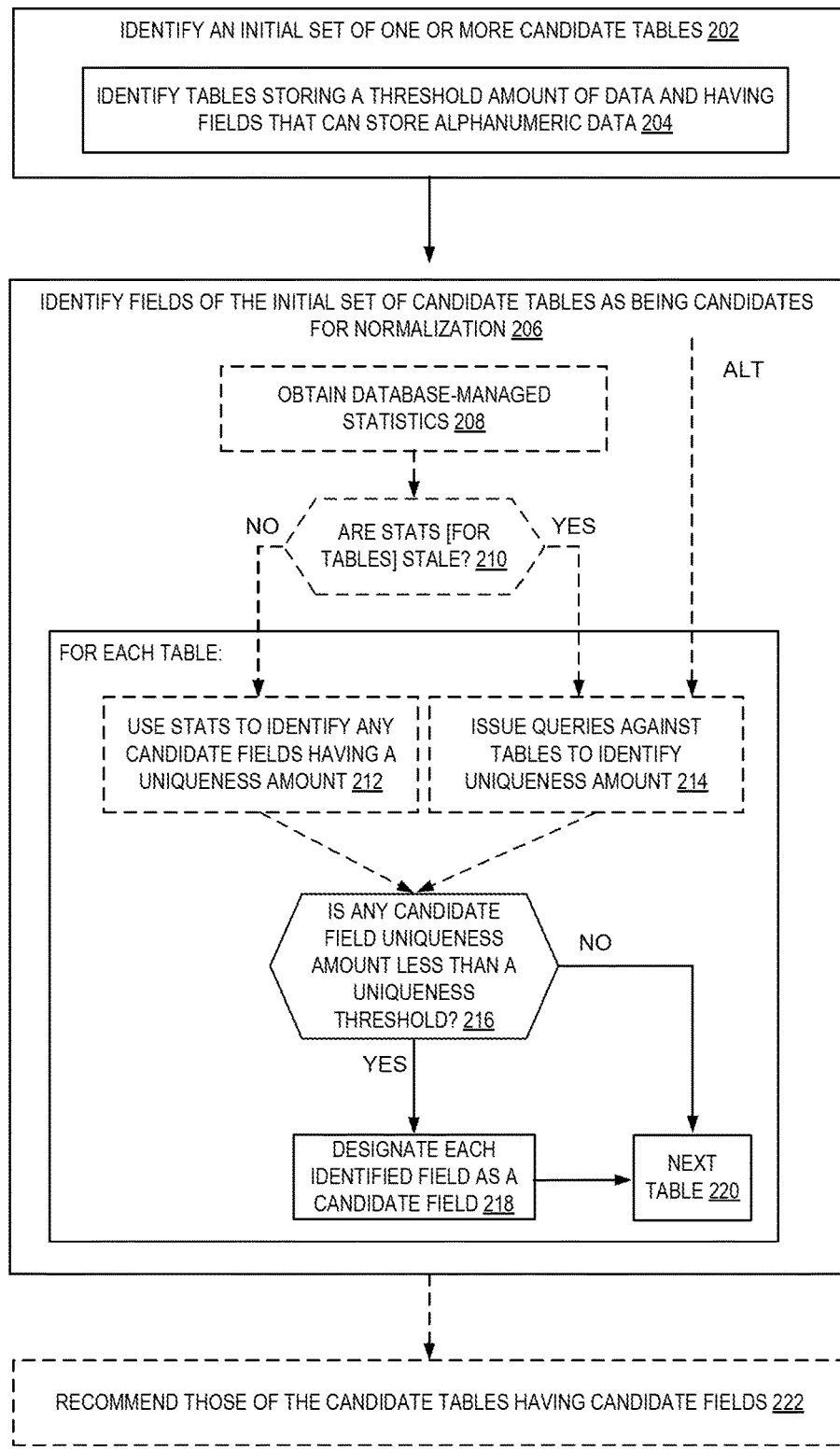
FIG. 2 is a flow diagram illustrating operations of a method for database table normalization candidacy detection according to some embodiments.

For example, FIG. 2 is a flow diagram illustrating operations 200 of a method for database table normalization candidacy detection according to some embodiments. Some or all of the operations 200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 200 are performed by the normalization engine 116 of the other figures.

The operations 200 include, at block 202, identifying an initial set of one or more candidate tables that may be candidates for normalization. For example, the normalization engine 116 may be instructed to monitor or examine one or more databases, which may be implemented by a database service within a provider network, implemented as stand-alone databases within another network or within the provider network via another service (e.g., via a hardware virtualization service), stored as database backups, etc.

Block 202 may include block 204 and identifying tables that store a threshold amount of data and have one or more fields that can store alphanumeric data—e.g., text, varchar, strings, blobs, etc. For example, block 204 may serve to identify—via use of the threshold—relatively "large" tables where normalization may become beneficial, as "small" tables (e.g., only a few kilobytes or megabytes in size, or only having a limited number of rows/entries) may not yield a benefit when normalized, as there may be increased database storage and/or processing overhead for implementing multiple tables (not to mention increased query processing overheads due to using JOINs or analyzing multiple tables in other ways) that may outweigh any benefits of normalizing these tables. Beneficially, the threshold can be configured to be larger or smaller by the implementor, based on preference, to be either "more" or "less" aggressive in identifying tables to be normalized. For example, the threshold may be based on an amount of storage space required for the table and could be satisfied when the table storage size is greater than some value (e.g., 5 MB, 500 MB, 1 GB, 10 GB, 1 TB, etc.). As another example, the threshold may be based on a number of rows/entries in the table and could be satisfied when that number rises above some value (e.g., 100 rows, 500 rows, 1000 rows, 50,000 rows, 1 million rows, etc.) Block 204 may also serve to identify—via detecting particular types of fields of the table—tables that have the potential to store data that could be normalized that would again result in benefits via a normalization. This determination may be based on detecting the existence of fields larger than another type of field used to implement normalization, such as an integer field added to the table to store foreign keys. For example, if a table includes a field that stores text-type values (many database field types exist, as known to those of skill in the art, as being able to store alphanumeric data), it is possible that there may be duplicated text that is stored in multiple entries in the table, and it is likely that these fields require substantially more bytes than that of an integer. Likewise, other types of fields can also be detected as being a candidate for normalization. For example, a datetime field (or timestamp field) may include many values that are the same, and because datetime fields are typically implemented requiring more storage space (e.g., 5 bytes, 8 bytes, 30 bytes, etc.) than a different field used for normalization (e.g., an integer field—often implemented using 1-4 bytes per value—which may serve as a foreign key to another table that could store the different datetimes that exist), it can be beneficial to normalize these types of fields. Thus, depending on the preferences of the implementor, logic defining what types of fields are candidates for normalization can be flexibly defined to be more or less aggressive in seeking to perform normalization.

The operations of block 202 and/or block 204 may be performed in a variety of ways. For example, in some embodiments the normalization engine 116 may query each database to identify the schema information associated with its tables, which may identify the sizes of the tables and may identify the "types" of each field/column in its tables. The normalization engine 116 may also obtain or read schema files that have been persisted or provided to the normalization engine 116, obtain database statistics maintained by the databases, etc.

The operations 200 also include, at block 206, identifying fields of the initial set of candidate tables as being candidates for normalization. Block 206 may serve the purpose of, having already identifying tables that potentially could benefit from normalization, narrowing these tables down to specific tables where normalization would, in fact, be beneficial.

In some embodiments, block 208 may optionally include block 208 for obtaining database-managed statistics (e.g., shown as statistics 122 in FIG. 1). As is known to those of skill in the art, some database engines maintain database table statistics that keep track of various characteristics of the tables—e.g., the size of the table, the cardinality of various columns of the table, the cardinality of indexes associated with the table, etc. In some cases, such statistics are generated/updated periodically (e.g., every few hours, every day, every week, etc.) for use by its query optimizer in determining how to best execute queries. In some embodiments, the normalization engine 116 may obtain these statistics at block 208, and optionally determine whether the statistics are "stale" (e.g., not current enough) at block 210, e.g., by comparing a data of when the statistics were last updated compared to a threshold value (e.g., some value based on a current time—3 hours in the past, 12 hours in the past, etc.). For example, a set of statistics may be deemed stale in some environments (e.g., generally having lots of database activity) if they are more than a few hours old, whereas in other environments (e.g., having not much activity, or having only non-modifying activity such as via lots of SELECT query statements) older statistics may still be "fresh." Accordingly, the threshold for determining if a set of statistics is too old (and thus "stale") may flexibly be configured based on the needs of the implementor.

If non-stale statistics exist, the operations 200 may continue with a set of operations for each table—e.g., at block 212 using the statistics to identify any candidate fields (e.g., text-type fields, as described above) of a table having a particular uniqueness amount. A uniqueness amount may be a value that indicates whether (and possibly to what degree) there is duplication between different values of the field. Thus, a uniqueness amount may be a cardinality value indicating that there are 25 unique values in a field that stores 50,000 entries (relatively low uniqueness), while another cardinality value may indicate that there are 49,995 unique values in a field that stores 50,000 entries (relatively high uniqueness). At decision block 216, this uniqueness amount—for each field of the table—can be compared against a uniqueness threshold to determine whether that field is a candidate field that could (or should) be normalized, and if so, it is designated at block 218. If not, or when all fields have been marked, the procedure may continue with a next table at block 220.

As is known to those of skill in the art, a "high cardinality" field is one with very unique or uncommon data values. For example, in a database table that stores bank account numbers, an "account number" field may have very high cardinality as every item of data should be unique. Normal cardinality fields are those with a somewhat unique percentage of data values. For instance, if a table holds customer information, the "Last Name" column would have normal cardinality. In many cases, not every last name may be unique (for example, there will likely be several occurrences of "Smith") but on the whole, the data is fairly non-repetitive. "Low" cardinality fields are those with very few unique values. In a customer table, a low cardinality column could be a "gender" column. This column might only have a limited number of possible values (e.g., "M" and "F", or perhaps a few others) to choose from, and all the records in the table will only include one of these limited values.

Additionally or alternatively to using statistics, in some embodiments the operations 200 may include block 214 and issuing queries against the tables to identify a uniqueness amount of the candidate fields (e.g., text-type fields, as described above). For example, in some embodiments the normalization engine 116 may issue queries to count the number of unique values in a particular field/column. As one example, one such query issued against a "description" field of a table named "audit_records" could be the following:

```
SELECT description, count( )
FROM audit_records
GROUP BY description
ORDER BY count( ) DESC
```

This query returns a two column-result set where a first column is a particular value (e.g., text string) and a second column indicating a number of times the corresponding value appeared in the different table entries. Of course, other variants of this query could be used to perform similar analysis that are known or derivable by one of skill in the art having possession of this description. In some embodiments, this resulting data can be used to identify an amount of duplication of data at decision block 216, for example, by computing a number of duplicated bytes (e.g., based on a length of each "description" value and the number of occurrences it has), and determining whether this computed value meets or exceeds some defined threshold.

Having identified the set of designated fields (per block 218) and their corresponding tables, various embodiments can proceed in multiple ways. For example, in some embodiments—such as when the normalization engine 116 acts as part of a database migration service—the operations may optionally include block 222, where the identified fields/tables are recommended to be normalized (e.g., to a user that issued the migration request). This can be particularly useful when a user is performing a large-scale migration (e.g., between two locations and/or database engines) that already requires some effort in modifying the application logic interfacing with the database—in such a scenario, it may be trivial for the user to modify the application logic to access normalized tables and/or do the normalization themselves (or, instruct the normalization engine 116 at circle (4) of FIG. 1 to perform the normalization on behalf of the user, as shown at circle (5A) of FIG. 1).

However, in some cases, it may not be beneficial to simply recommend normalization to a user, such as when an involved user is relatively unsophisticated or does not have the time or ability to modify the database client code/application. For example, a user may utilize an application from another developer and may not have the ability to modify its source code. Thus, with reference to FIG. 1, at circle (5A) the normalization engine 116 may normalize one or more tables, each into a set of corresponding tables 120. In this example, table A 118A is normalized into two tables 120A—table A' 118K and table B 118B, which may be within the same database 114A, in another database 114B of the same database engine 112A, or as tables 120B of another database of another database engine 112N. Examples showing how to perform some types of normalization will be presented herein later with regard to FIG. 5 and FIG. 6.

Because table A 118A will no longer exist in its previous form, in some embodiments the normalization engine 116 may cause other operations to be performed to allow the modified tables 120A to be used in place of table A 118A.

As one example, the normalization engine 116 may cause a database "view" 134 to be generated at circle (5B) that mirrors the old schema of table A 118A but instead utilizes the underlying normalized tables 120A. As is known to those of skill in the art, a view may be referred to as the result set of a stored query on the data that database clients can query just as they would in a persistent database collection object, and may be implemented as a virtual table, a materialized view, etc. Typically, unlike ordinary base tables in a database, a view does not form part of the physical schema of the database: as a result set, it is a virtual table computed or collated dynamically from data in the database when access to that view is requested. Thus, changes applied to the data in a relevant underlying table are reflected in the data shown in subsequent invocations of the view.

In some embodiments, the creation of a view 134 to simulate the existence of the "old" table A 118A may be an excellent solution to avoid the need to update database clients to reference the new schema of the new tables 120A. For example, in some cases where a database is not modified (or when data of the database is not modified very often) and thus many read-only type accesses are made (e.g., via SQL SELECT statements) this configuration works very well. However, with some views, any queries that modify the table or its data (e.g., SQL UPDATE or INSERT statements, among others) may not function properly because the database client is attempting to change something that may not exist. However, in some embodiments a database may provide (and thus the normalization engine 116 may create) "updatable" views 134 that can be modified by the database clients and thereafter the database engine can determine the proper mapping between the view 134 and its underlying tables 120A to perform the proper modification to the actual underlying data/tables.

To address scenarios in which views may not be updatable, in some embodiments the normalization engine 116 may cause a database proxy 128 at circle (5C) to rewrite some or all queries (not illustrated) at circle (6)—e.g., only data/table modifying queries in which case read-only queries could be sent to a view, or all queries and thus these rewritten queries can be sent directly to the database engine(s). Thus, the calling database clients need not have knowledge of the updated schema(s) or that the original table(s) have even been normalized, and instead may simply benefit from the normalization and its resulting storage "compression" and possibly speedup due to the ability of the database engines to store more (or all) of the table data in memory. Accordingly, at circle (5C) the normalization engine 116 may send normalization metadata 138 to the database proxy 128. The normalization metadata 138 may identify the "previous" table (e.g., table A 118A) as well as the resultant normalized tables (e.g., tables 120A) and may include information indicating how to map the different schemas/configurations. For example, the normalization metadata 138 may indicate that a new field has been added to the source table A 118A to form table A' 118A', where the new field includes an identifier of an entry in a new table B 118B that is to serve as a value for that particular entry. Thus, with this metadata 138, the database proxy 128 can receive queries, determine if the queries involve a normalized table (e.g., by parsing/analyzing the query to identify table names), and rewrite the query based on the characteristics of the updated tables 120A to properly perform the operations sought by the query.

Figure 3:
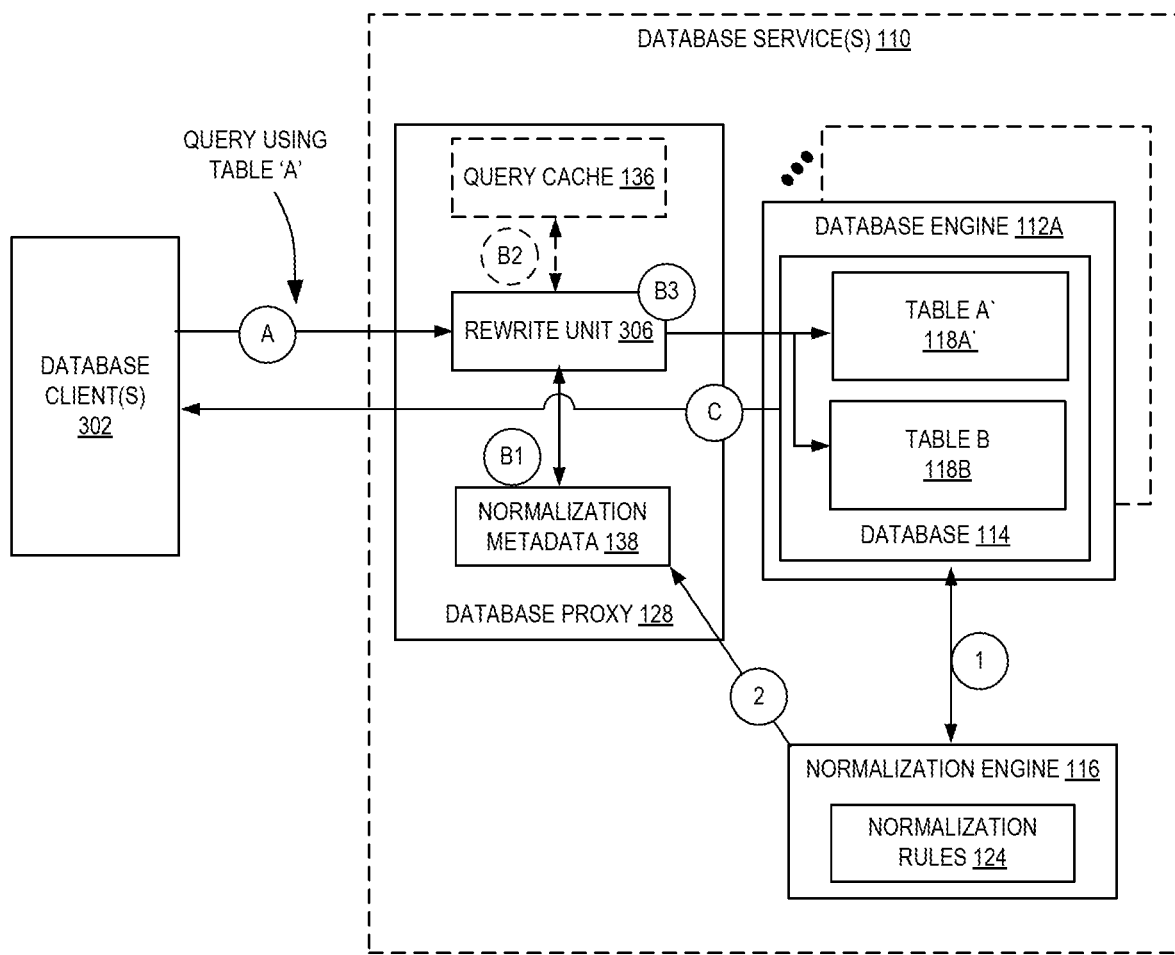
FIG. 3 is a diagram illustrating an environment for transparent database normalization via proxy-based query rewriting according to some embodiments.

For example, FIG. 3 is a diagram illustrating an environment for transparent database normalization via proxy-based query rewriting according to some embodiments. In this environment, the normalization engine 116 has normalized a table A into table A' 118A' and table B 118B at circle (1) and provided normalization metadata 138 to the database proxy 128 at circle (2). The database proxy 128 may be deployed in a manner so that it is communicatively coupled between the database client(s) 302 and the database engine(s) 112A-112N (i.e., lies in a communication path therebetween), where the database proxy may be visible to the clients 302 or invisible to the clients 302. At circle (A), a query originated by a database client 302 that involves table A is received at the database proxy 128, where a rewrite unit 306 may parse the query to identify which tables the query references.

The rewrite unit 306 may be adapted to parse communications received from a database client according to a programmatic interface. Structured Query Language (SQL) requests, for instance, may be received from a database client via a JDBC or ODBC interface for performing SQL statements at the corresponding database engine. Thus, the rewrite unit 306 may be configured to parse and/or evaluate the SQL statement, e.g., to identify tables referenced therein.

Using the normalization metadata 138 at circle (B1), the rewrite unit 306 can determine that the query does reference a table that has been normalized (e.g., by attempting to find a match by comparing table names identified in the query to table names of the normalization metadata 138 designated as having been normalized).

The rewrite unit 306, using the normalization metadata 138 that indicates how the normalization has been implemented, may then rewrite the query to instead reference the normalized tables.

In some embodiments, the original query—or a version thereof, such as a version having custom parameters removed therefrom (e.g., "SELECT*FROM users WHERE user_id='52'" could be modified as "SELECT*FROM users WHERE user_id='$PARAM[1]'", where $PARAM[1] serves as a placeholder)—may be stored in a query cache 136 together with the rewritten query (or a version thereof, such as one including placeholders) that references the normalized tables. Alternatively, a derivation of the original query (or query variant) could be used as a key/index in the query cache 136, such as the result of that query (or query variant) being hashed using a hashing algorithm. This may allow for significant storage/memory savings, which may allow the rewrite cache to be kept in memory instead of being persisted and accessed from disk.

Accordingly, in embodiments so using a query cache 136, the rewrite unit 306 may perform a lookup in the cache (e.g., by replacing query-specific custom values in the query and using this version to index the rewrite cache) to rapidly identify the rewritten query version thereof, thus avoiding the need to perform custom rewriting.

Once the correct query has been generated, at circle (B3) the rewrite unit 306 may send this query on to the relevant database engine 112A where the query is serviced using the normalized tables, and the query result may be sent at circle (C) back via the database proxy 128 to the database client 302.

Figure 4:
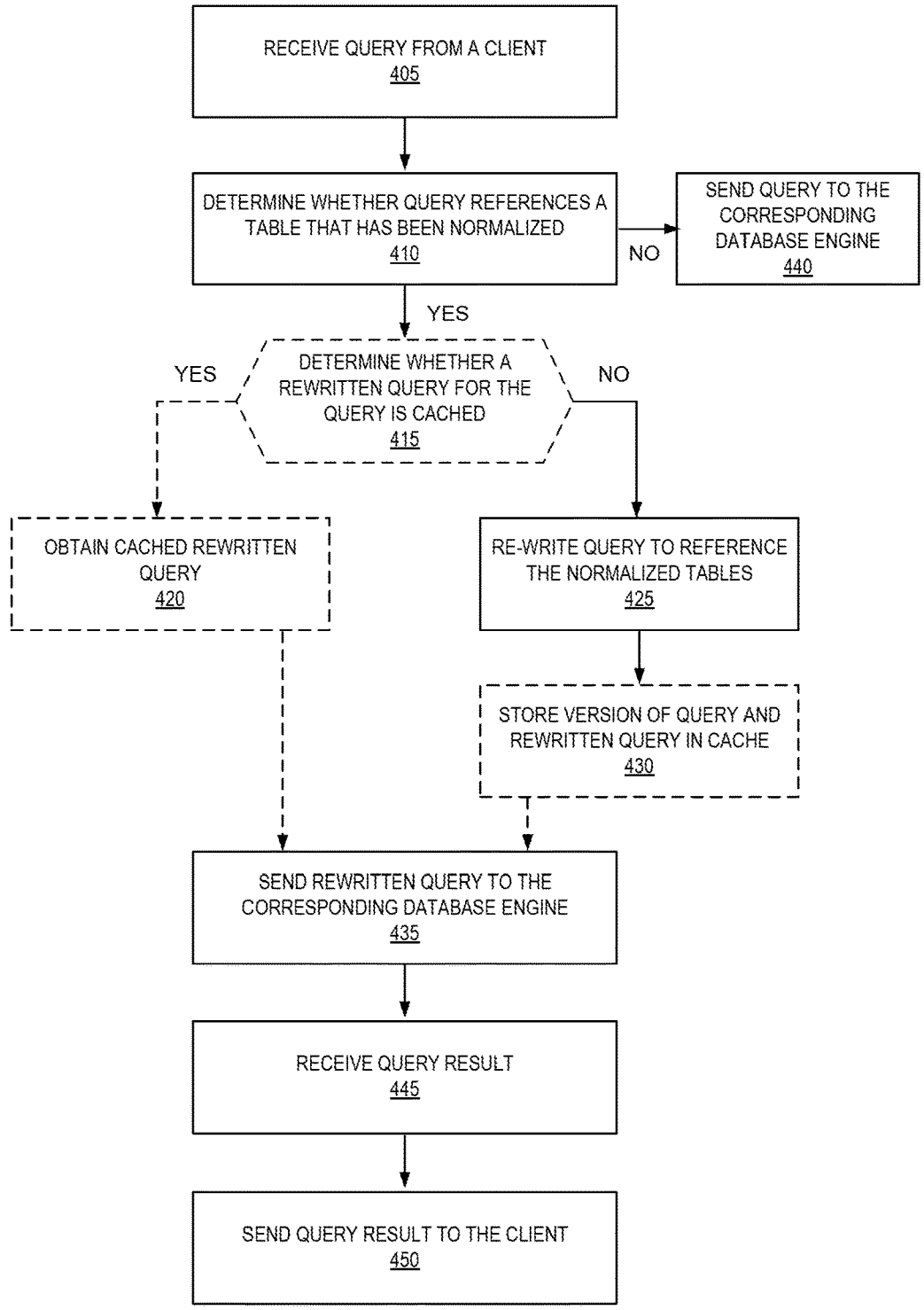
FIG. 4 is a flow diagram illustrating operations of a method for database table normalization according to some embodiments.

For further detail, FIG. 4 is a flow diagram illustrating operations of a method for database table normalization according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the database proxy 128 of the other figures.

At block 405, the operations 400 include receiving a query from a client. The query may be a SQL query, and may reference at least one table of a database that has been normalized. At block 410, the operations 400 include determining whether the query references a table that has been normalized. In some embodiments, block 410 includes parsing the query to identify all tables named in the query, and searching a data structure (e.g., data from normalization metadata provided by a normalization engine) having a list of tables that have been normalized. When a table named in the query is not found to be in the list, the operations may include sending the query to the corresponding database engine at block 440.

Otherwise, optionally the operations 400 include block 415 and determining whether a rewritten query for the query is cached. In some embodiments, block 415 includes removing query-specific values (e.g., custom parameter values) from the query, and using this version of the query to perform a lookup in a cache to see if a matching entry is found. If so, the operations may continue to block 420 and obtaining the cached rewritten query and sending at block 435 the rewritten query to the corresponding database engine. If not, or in embodiments where block 415 is not utilized, the operations 400 may include block 425 and rewriting the query to reference the normalized tables. Optionally, at block 430, a version of the query (e.g., having query-specific values removed) and a version of the rewritten query (e.g., having query-specific values removed) can be stored in the cache, and at block 435 the rewritten query is sent to the corresponding database engine.

Upon the database engine generating a query result, the database engine sends back this result and at block 445 the query result is received, and at block 450, sent on to the client.

For further detail regarding normalization techniques, FIG. 5 is a diagram illustrating exemplary database normalization according to some embodiments. In this example, a simplified first table 502 called "audit_records" is shown as having two fields—an identifier (or "ID") field that stores integers (e.g., an auto-incrementing integer field that can serve as a key), and a "description" field (e.g., a text field such as varchar or blob). As indicated above, this table 502 may be initially identified as being a candidate for normalization by determining that it is of a sufficient size and that it includes a field that can store text values. To determine whether any fields of this table may then be normalized, a query 504 may be issued to identify characteristics of the data stored in the table 502. In this case, the query 504 seeks a result set identifying the unique values in the description field along with corresponding counts indicating how many times each value appears in the table. In this example, the query result 506 includes that a first value ("USER MADE A LOGON ATTEMPT") appears ten thousand times, a second value ("USER LOGGED OUT") appears eight thousand times, and a third value ("USER WAS SHOWN AD=1XVZ") appears exactly once. In this case, we assume that the uniqueness threshold has been satisfied, as these values are of relatively low uniqueness and thus may benefit from normalization.

Accordingly, the normalization engine may cause the table 502 to be normalized into two tables—a first "modified" audit_records table 510 (which may actually be the audit_records table 502, but modified, or may potentially be an entirely separate "new" table) and a second audit_records_description table 512. The first table 510 may include a "new" field compared to the original table 502 of "description_id", which serves as a foreign key to the second table 512 by identifying values of that table to be associated with values of the first table 510. For example, a first entry for the first table 510 (ID=1) has a description ID value of "1", meaning that the "description" field for that entry (where may have had the values stripped and thus be null, as shown, or the field may be completely removed) should be the description of "USER MADE A LOGON ATTEMPT" form the second table 512. Notably, this normalization results in significant space savings, as instead of needing over eighteen-thousand text values in the initial table 502, only 18,000 small integer values (of the description ID field) are needed in the first table while the second table only requires three entries.

Figure 6:
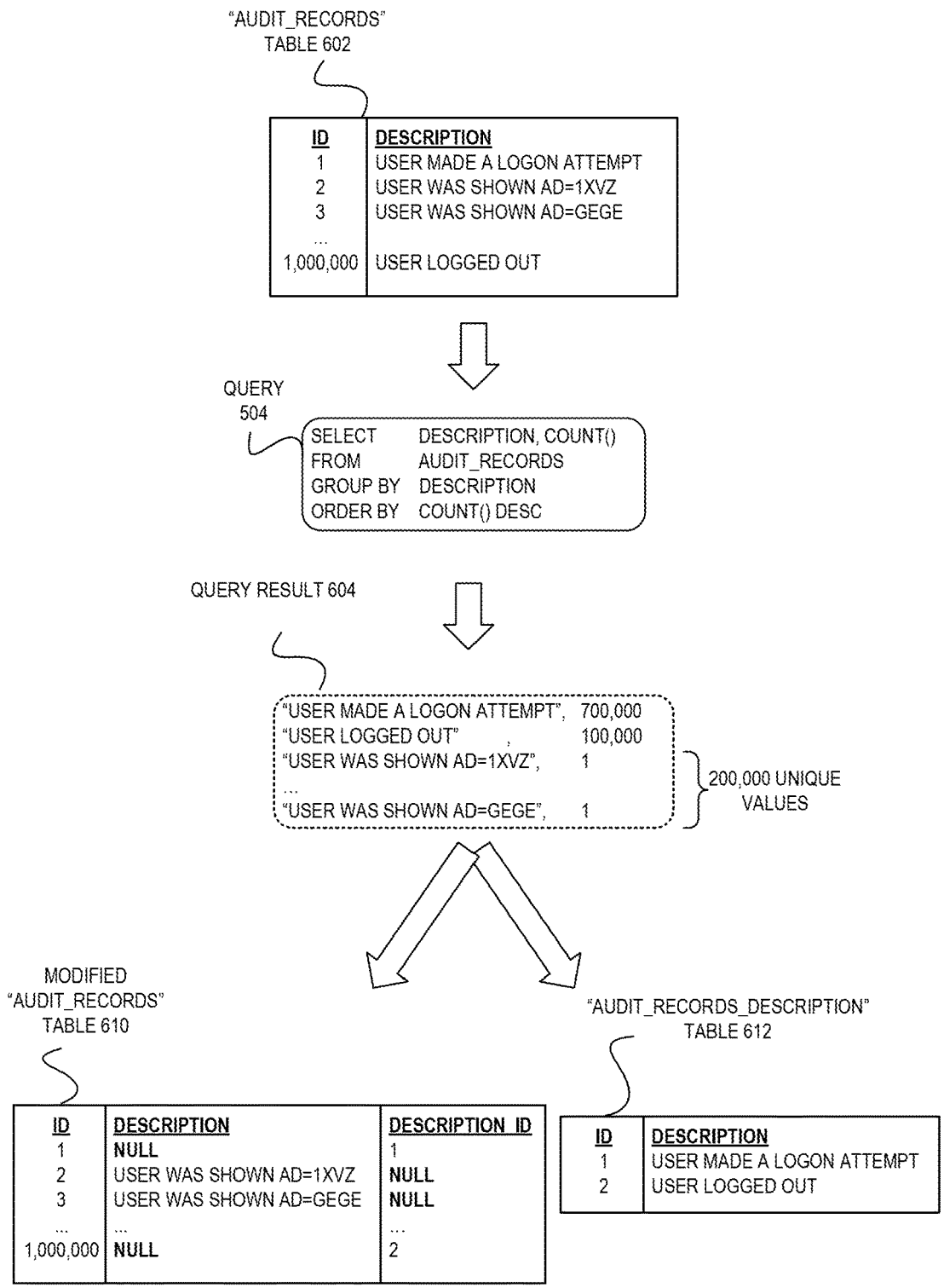
FIG. 6 is a diagram illustrating exemplary partial database normalization according to some embodiments.

Another example is shown in FIG. 6, which is a diagram illustrating exemplary partial database normalization according to some embodiments. In contrast to FIG. 5, in which a complete database normalization procedure was performed (due to all "description" values being removed from the first table), FIG. 6 shows a scenario in which the normalization engine 116 may implement a "partial" normalization procedure where only some of the values of field/column are removed from the first table.

For example, the audit_records table 602 now includes one million total records, and upon executing the query 504 to identify the uniqueness characteristics of the data stored in this table, the result 604 now indicates that a first string shows up 700,000 times, a second string shows up 100,000 times, and each of the remaining 200,000 values are unique. In this case, performing a complete normalization may be somewhat beneficial, though still relatively inefficient due to the need to have a new secondary table that includes 200,002 entries.

Instead, as shown by tables 610 and 612, in some embodiments those values that repeat a particular amount (e.g., more than twice, more than ten times, those that make up more than X % of the overall number of values, etc.) may be removed from the first table and inserted into the second table, similar to what is shown in FIG. 5. However, the remainder of the values may remain in the first table. Thus, the "description" field of the first table 610 may include 800,000 entries of null (with 800,000 corresponding integer values in a new "description ID" field to reference the second table) but 200,000 entries with the original values. As a result, the space previously required to store 800,000 entries is eliminated in favor of adding a relatively small new column "description_id" along with a very small second table 612.

Figure 7:
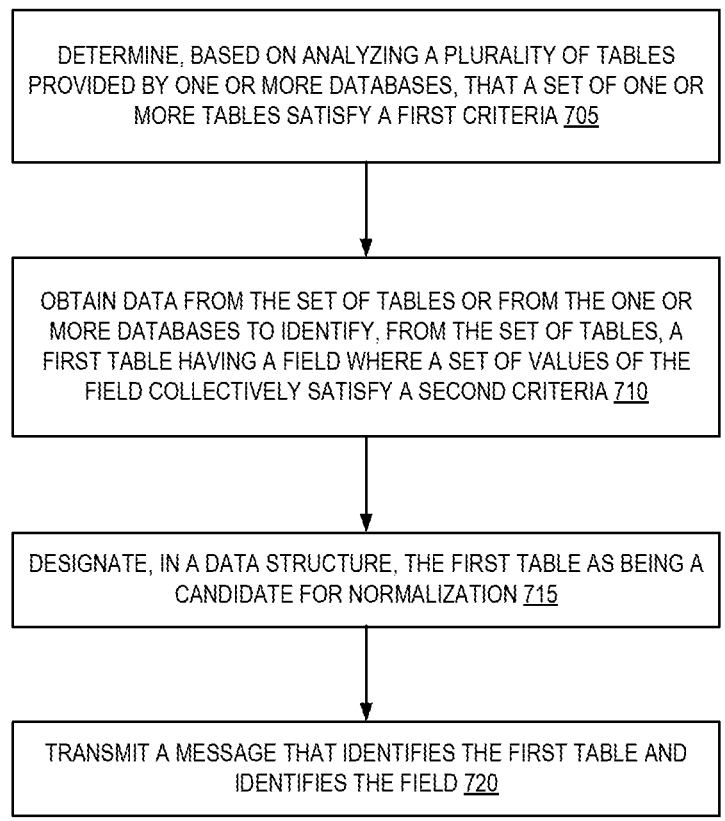
FIG. 7 is a flow diagram illustrating operations of a method for database normalization according to some embodiments.

FIG. 7 is a flow diagram illustrating operations of a method for database normalization according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the normalization engine 116 of the other figures.

The operations 700 include, at block 705, determining, based on analyzing a plurality of tables provided by one or more databases, that a set of one or more tables satisfy a first criteria. The first criteria may be satisfied for a table when the table includes a total amount of data of a threshold size and/or when the table includes a particular type of field—e.g., a field that can store alphanumeric data (or "text"), such as varchar, varchar2, char, nchar, lob, blob, binary, text, JSON, and the like. Block 705 may include obtaining database statistics of an operational database, obtaining a database backup or similar "flat" representation of a database, obtaining a schema of a database, etc.

In some embodiments, block 705 includes determining that each table of the set of tables has a first threshold amount of data and includes a field of a type that can store alphanumeric data.

The operations 700 further include, at block 710, obtaining data from the set of tables or from the one or more databases to identify, from the set of tables, a first table having a field where a set of values of the field collectively satisfy a second criteria. The second criteria may be satisfied by a set of values of a field when a threshold percentage of the values of the field have a same value, when a cardinality (the number of unique values in the field) is less than a threshold amount (e.g., a percentage of all values, a fixed number, etc.), etc. Block 710 may include issuing a query involving the databases, obtaining statistics maintained by the databases, etc.

In some embodiments, the set of values of the field collectively satisfy the second criteria when the field has a cardinality that falls beneath a second threshold amount.

In some embodiments, the set of values of the field collectively satisfy the second criteria when: the set of values of the field are a subset of all values of the field; each of the set of values has a same value; and the set of values collectively require a third threshold amount of storage or make up a fourth threshold percentage of the all values of the field.

The operations 700 further include, at block 715, designating the first table within a data structure as being a candidate for normalization, and at block 720, transmitting a message that identifies the first table and identifies the field. The data structure may be a database table, a file, an in-memory data structure, etc., and may include identifiers of one or more tables. The message may be sent to database proxy and indicate that the first table has been normalized to remove at least some values of the field from the table. The message may also be sent to a user associated with one or more of the set of tables or databases to recommend that the table(s) be normalized, which in some embodiments may be part of a database migration process.

In some embodiments, the message comprises one or more queries sent to the database that provides the first table, the one or more queries indicating that the set of values are to be removed from the first table and at least one of the set of values is to be inserted into a second table. In some embodiments, the one or more queries indicate that an additional field is to be created in the first table to store, for each entry of the first table, a value indicating whether the entry has been normalized or identifying an entry of the second table.

In some embodiments, blocks 705 and 710 are performed as part of a database migration process seeking to move the plurality of tables of the one or more databases of a first database engine into a second database engine of a different type than the type of the first database engine.

In some embodiments, the operations 700 further include generating at least a second table to store at least one of the set of values; and removing the set of values from the first table, wherein the message is transmitted to a database proxy that is communicatively coupled between the one or more databases and clients of the one or more databases. In some embodiments, the operations 700 further include receiving, by the database proxy, a first query issued by a client seeking to perform operations involving the first table; generating a second query based on rewriting the first query to reference the first table as well as the second table; and sending the second query to the database that provides the first table and the second table to be executed. In some embodiments, the operations further include storing by the database proxy, the second query or a modified version of the second query as an entry in a cache; receiving, by the database proxy, a third query to perform operations involving the first table, wherein the third query is the same as the second query or includes similar portions as the second query; identifying the entry in the cache based on the third query; and sending, to the database, the second query, the modified version of the second query, or a fourth query generated based on the second query or the modified version of the second query to be executed.

In some embodiments, the operations 700 further include creating a database view that has a same schema as the first table and a same name as the first table, wherein the database view utilizes: a modified version of the first table that does not include the set of values, and a second table that stores the set of values; and causing a query that references the first table via the name to use the database view.

Figure 8:
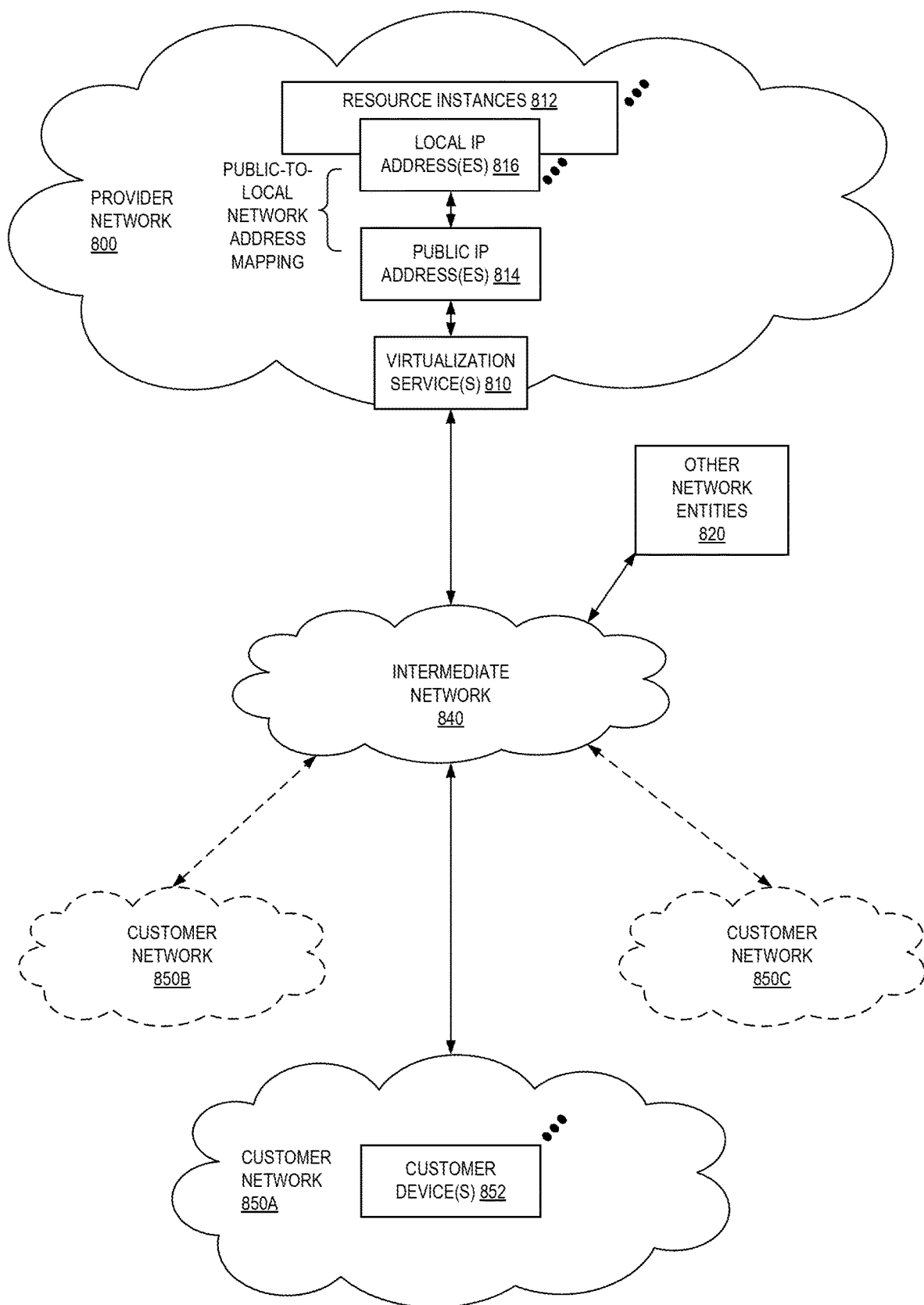
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
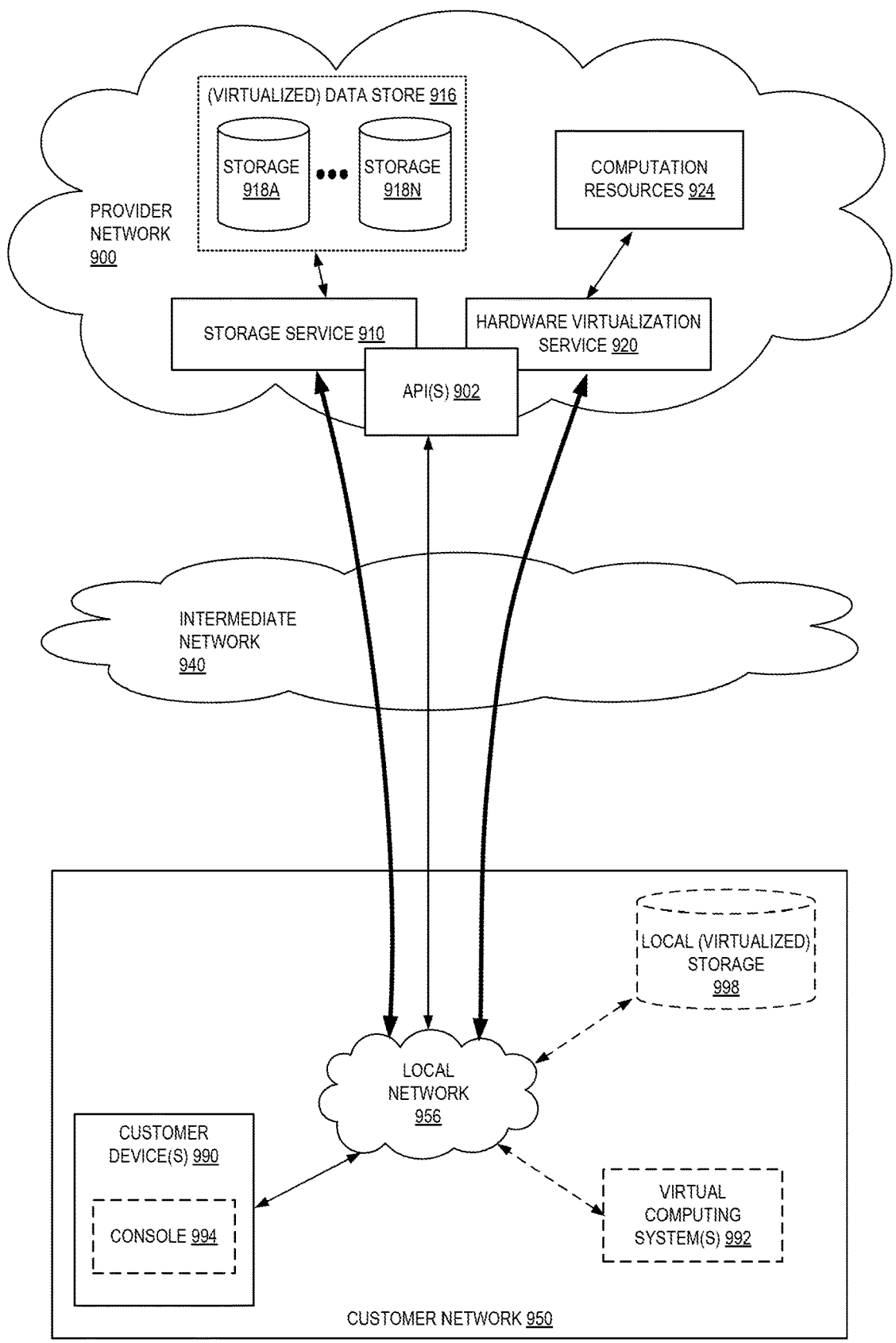
FIG. 9 is a block diagram of an example provider network that provides a storage service and a hardware virtualization service to customers according to some embodiments.

FIG. 9 is a block diagram of an example provider network that provides a storage service and a hardware virtualization service to customers according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
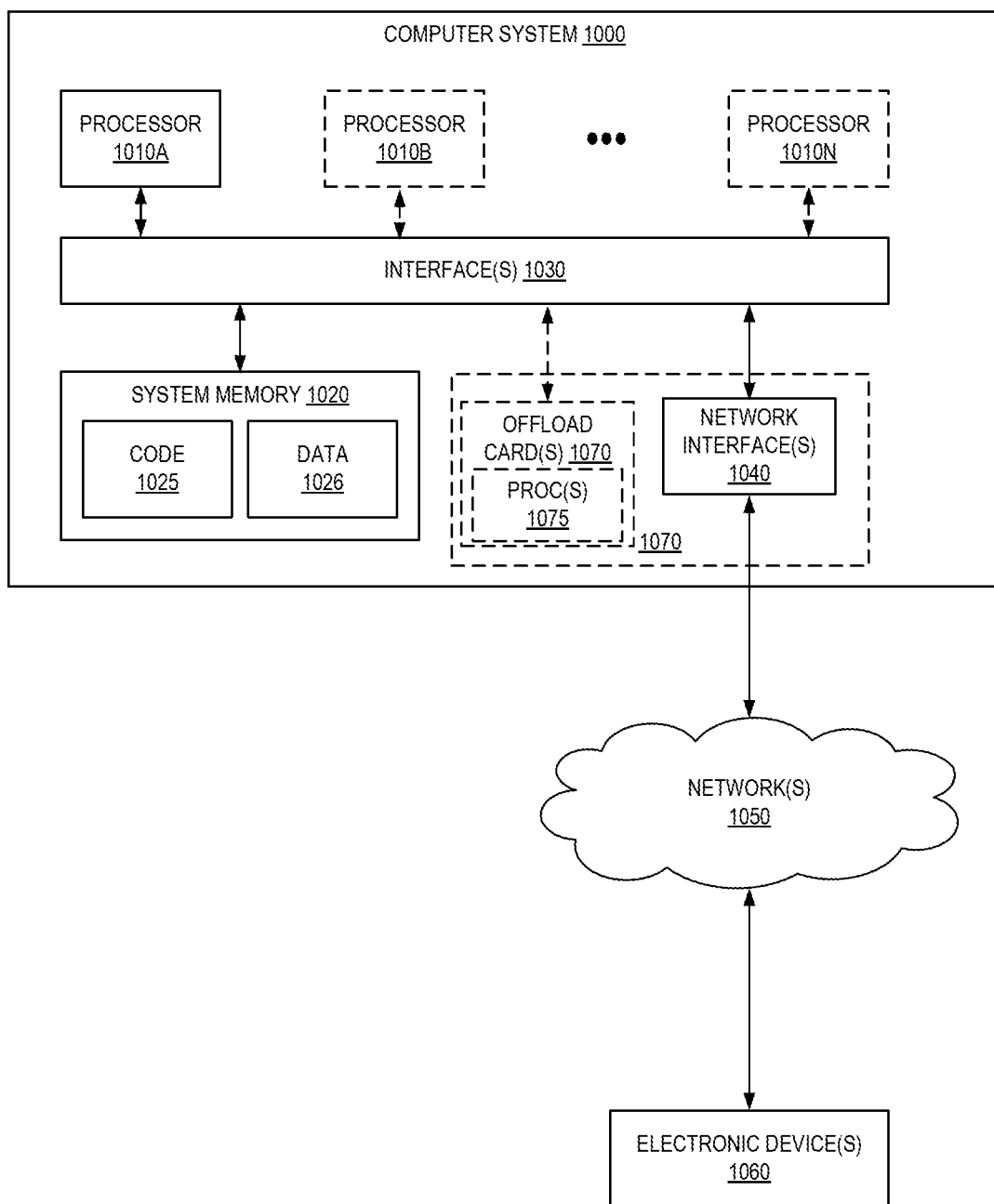
FIG. 10 is a block diagram illustrating an example computer system that may be used in some embodiments.

In some embodiments, a system that implements a portion or all of the techniques for database normalization recommendation and/or transparent database normalization as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   determining, based on analyzing a plurality of tables of one or more databases, that each of a set of one or more of the plurality of tables is of a table size exceeding a first threshold amount and includes at least one field of a type that stores alphanumeric data;
   identifying, from the set of one or more tables, a first table having a field where a set of values of the field collectively satisfy a second criteria, the second criteria being satisfied only when a uniqueness amount of the values of the field is less than a second threshold amount;
   determining to perform a normalization process involving the first table based at least in part on both: the first table having a table size exceeding the first threshold amount, and the set of values of the field collectively having a uniqueness amount below the second threshold amount;
   performing the normalization process involving the first table to yield an updated database table layout for data of the first table that utilizes the first table and also a second table, the normalization process including removing the set of values from the first table and inserting at least one of the set of values into the second table such that a data storage size of the first table and the second table after the normalization process is performed is less than a data storage size of the first table before the normalization process is performed;
   rewriting, by a database proxy communicatively coupled between the one or more databases and one or more database clients, a first query received by the database proxy into a second query to adhere to the updated database table layout, the first query identifying the first table but not the second table, the second query identifying both the first table and the second table; and
   sending the second query to the database that provides the first table and the second table.

2. The computer-implemented method of claim 1, wherein the performing the normalization process includes removing the set of values from the first table while keeping another set of values of the same field in the first table.

3. The computer-implemented method of claim 1, wherein the identifying the first table includes:
   sending a query to the database that provides the first table to compute a number of occurrences of each unique value of the field of the first table; or
   obtaining database statistics generated by the database, the database statistics including a cardinality value.

4. A computer-implemented method comprising:
   determining, based on analyzing a plurality of tables of one or more databases, that a set of one or more tables satisfy a first criteria;
   obtaining data from the set of one or more tables or from the one or more databases to identify, from the set of one or more tables, a first table having a field where a set of values of the field collectively satisfy a second criteria;
   determining to perform a normalization process involving the first table based at least in part on both: the first table having a table size that exceeds a table size threshold of the first criteria, and the set of values collectively having a uniqueness amount below a uniqueness threshold of the second criteria;

performing the normalization process involving the first table to yield an updated database table layout for data of the first table that utilizes the first table and also a second table, the normalization process including:

causing at least the second table to store at least one of the set of values, and removing the set of values from the first table such that a data storage size of the first table and the second table after the normalization process is performed is less than a data storage size of the first table before the normalization process is performed;

causing a first query originated by a client that identifies the first table but not the second table to be executed via use of the first table and the second table; and wherein causing the first query to be executed via use of the first table and the second table is based on rewriting the first query into a second query that adheres to the updated database table layout.

5. The computer-implemented method of claim 4, wherein determining that the set of one or more tables satisfy the first criteria comprises:

determining that each table of the set of one or more tables has a first threshold amount of data, the first threshold amount being an amount of storage space or a number of rows; and determining that each table of the set of one or more tables includes a field of a type that can store alphanumeric data.

6. The computer-implemented method of claim 5, wherein the set of values of the field collectively satisfy the second criteria when:

the field has a cardinality that falls beneath a second threshold amount.

7. The computer-implemented method of claim 5, wherein the set of values of the field collectively satisfy the second criteria when:

the set of values of the field are a subset of all values of the field;

each of the set of values has a same value; and the set of values collectively require a third threshold amount of storage, make up a fourth threshold percentage of all values of the field, or include at least a fifth threshold number of values.

8. The computer-implemented method of claim 4, wherein performing the normalization process comprises transmitting one or more queries to the database that provides the first table, the one or more queries indicating that the set of values are to be removed from the first table and at least one of the set of values is to be inserted into the second table.

9. The computer-implemented method of claim 8, wherein the one or more queries indicate that an additional field is to be created in the first table to store, for each entry of the first table, a value indicating whether the entry has been normalized or identifying an entry of the second table.

10. The computer-implemented method of claim 4, wherein the determining that the set of one or more tables satisfy the first criteria and the obtaining is performed as part of a database migration process seeking to move the plurality of tables of the one or more databases into another one or more databases of a same or different type.

11. The computer-implemented method of claim 4, further comprising:

generating at least the second table to store at least one of the set of values; and transmitting a message that identifies the first table and identifies the field to a database proxy that is communicatively coupled between the one or more databases and clients of the one or more databases.

12. The computer-implemented method of claim 11, wherein executing the first query comprises:

receiving, by the database proxy, the first query;

generating a second query based on rewriting the first query to reference the first table as well as the second table; and sending the second query to the database that provides the first table and the second table to be executed.

13. The computer-implemented method of claim 12, further comprising:

storing by the database proxy, the second query or a modified version of the second query as an entry in a cache;

receiving, by the database proxy, a third query to perform operations involving the first table, wherein the third query is the same as the first query or includes similar portions as the first query;

identifying the entry in the cache based on the third query; and sending, to the database instead of the third query, the second query, the modified version of the second query, or a fourth query generated based on the second query or the modified version of the second query to be executed.

14. The computer-implemented method of claim 4, further comprising:

creating a database view that has a same schema as the first table and a same name as the first table, wherein the database view utilizes:

a modified version of the first table that does not include the set of values, and the second table that stores the set of values; and wherein executing the first query comprises use of the database view.

15. A system comprising:

a first one or more electronic devices to implement a database proxy to be communicatively coupled between a plurality of databases of a provider network and one or more database clients; and a second one or more electronic devices to implement a normalization engine, the normalization engine including instructions that upon execution cause the normalization engine to:

determine, based on analyzing a plurality of tables of one or more databases of the plurality of databases, that a set of one or more tables satisfy a first criteria;

obtain data from the set of one or more tables or from the one or more databases to identify, from the set of one or more tables, a first table having a field where a set of values of the field collectively satisfy a second criteria;

determine to perform a normalization process involving the first table based at least in part on both: the first table having a table size that exceeds a table size threshold of the first criteria, and the set of values collectively having a uniqueness amount below a uniqueness threshold of the second criteria; and perform the normalization process involving the first table to yield an updated database table layout for data of the first table that utilizes the first table and also a second table, the normalization process including:

causing at least the second table to store at least one of the set of values, and removing the set of values from the first table;

wherein the normalization process is to cause a data storage size of the first table and the second table after the normalization process is performed to be less than a data storage size of the first table before the normalization process is performed; and wherein the database proxy is to cause a first query, originated by a client, that identifies the first table but not the second table to be executed via use of the first table and the second table based on rewriting the first query to a second query that adheres to the updated database table layout.

16. The system of claim 15, wherein to determine that the set of one or more tables satisfy the first criteria, the normalization engine is to:

determine that each table of the set of one or more tables has a first threshold amount of data and includes a field of a type that can store alphanumeric data, the first threshold amount being an amount of storage space or a number of rows.

17. The system of claim 16, wherein the set of values of the field collectively satisfy the second criteria when the field has a cardinality that falls beneath a second threshold amount.

18. The system of claim 16, wherein the set of values of the field collectively satisfy the second criteria when:

the set of values of the field are a subset of all values of the field;

each of the set of values has a same value; and the set of values collectively require a third threshold amount of storage, make up a fourth threshold percentage of all values of the field, or include at least a fifth threshold amount of values.

19. The system of claim 15, wherein the database proxy is to:

receive the first query;

generate a second query based on rewriting the first query to reference the first table as well as the second table; and send the second query to the database that provides the first table and the second table to be executed.

20. The system of claim 19, wherein the database proxy is further to:

store the second query or a modified version of the second query as an entry in a cache;

receive a third query to perform operations involving the first table, wherein the third query is the same as the first query or includes similar portions as the first query;

identify the entry in the cache based on the third query; and send, to the database instead of the third query, the second query, the modified version of the second query, or a fourth query generated based on the second query or the modified version of the second query to be executed.

* * * * *